Figure 1:
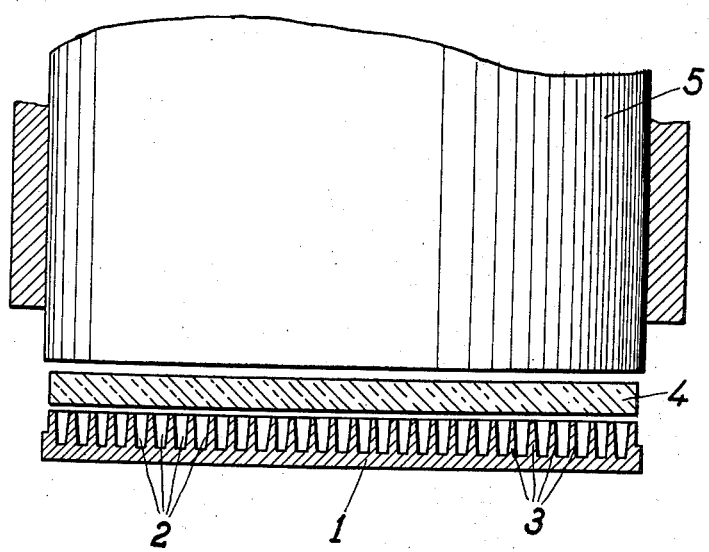

Feb. 12, 1963

KARL-HEINZ SCHNOOR

METHOD FOR PRODUCING SHAPED BODIES OF
HIGH-DENSITY CARBON DIOXIDE

Filed Oct. 5, 1959

3,077,081

2 Sheets-Sheet 1

INVENTOR.
Karl-Heinz Schnoor
by: Michael S. Striker
Attorney

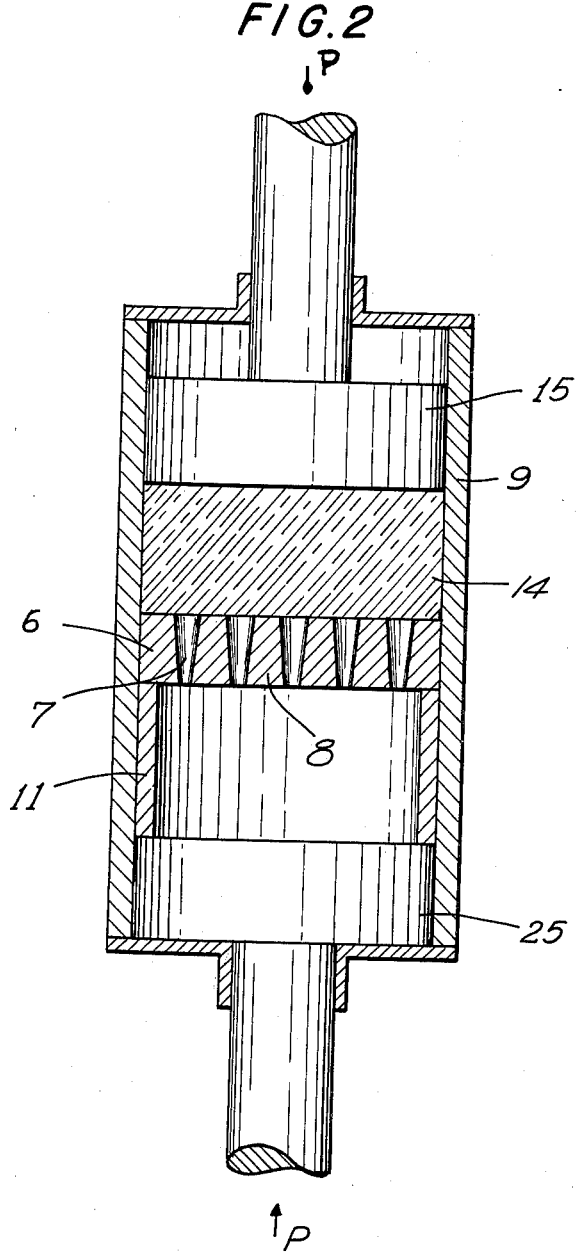

United States Patent Office
3,077,081
Patented Feb. 12, 1963

3,077,081
METHOD FOR PRODUCING SHAPED BODIES OF HIGH-DENSITY CARBON DIOXIDE
Karl-Heinz Schnoor, Buderich, Dusseldorf, Germany, assignor to Agefko Kohlensaeure-Werke G.m.b.H., Dusseldorf, Germany
Filed Oct. 5, 1959, Ser. No. 844,423
9 Claims. (Cl. 62—10)

The present invention relates to a method and apparatus for producing shaped bodies of high density carbon dioxide, and more particularly, the present invention relates to small high-density carbon dioxide bodies which are substantially free of inner surface and which will evaporate at a relatively slow rate.

Small bodies of solid carbon dioxide, i.e., of the material commonly referred to as Dry Ice, were previously produced by cooling non-solid carbon dioxide in small molds so as to transform the carbon dioxide into solid condition, or by cutting or otherwise reducing the size of larger Dry Ice bodies. The first method, i.e., the cooling of carbon dioxide so as to immediately produce solid carbon dioxide bodies of the desired shape, is too expensive for the production of carbon dioxide bodies having an individual weight of the magnitude of 1 gram or less, and the second method does not result in the formation of a great number of carbon dioxide bodies of equal weight. It has also been attempted to compress carbon dioxide snow into tablets of the desired size and shape. However such carbon dioxide snow tablets could not be compressed to a sufficiently high degree, they retain their powdery structure and such tablets possess a specific gravity or density of only about 1.3. Due to the large irregular outer and inner surface of such tablets, they evaporate at a great speed so that it is difficult to use tablets formed by compressing carbon dioxide snow as propellant for aerosol containers or the like. In fact, for all practical purposes, compressed carbon dioxide snow tablets cannot be used for this purpose. Thus, it is emphasized when tablets formed by compressing carbon dioxide snow are to be used, the liquid-filled containers into which the tablet is placed must be closed immediately after insertion of the tablet. Thus, it is not possible on a large scale to introduce such tablets into a great number of liquid-filled containers, since due to the great evaporation rate of such tablets, even upon the fastest possible insertion of the tablets and immediate closing of the container, the individual tablets will have evaporated to a varying extent and thus it will not be possible to avoid pressure variations in the closed containers.

It is therefore an object of the present invention to provide a method and apparatus for producing high density solid carbon dioxide tablets in a simple and economical manner.

It is another object of the present invention to provide a method and aparatus for producing high density carbon dioxide bodies of predetermined configuration and substantially free of inner surface, which bodies will evaporate at a relatively slow and constant rate.

It is yet a further object of the present invention, to provide a method and apparatus whereby small shaped bodies of high density solid carbon dioxide, having a density higher than 1.5 and up to about 1.56 can be mass produced.

Other objects and advantages of the present invention will become apparent from a further reading of the description and of the appended claims.

With the above and other objects in mind, the present invention includes a method of producing solid, high density carbon dioxide bodies of predetermined configuration, comprising the step of pressing an initial body of solid carbon dioxide through passages having a converging shape of continuously descreasing cross-section in the direction of flow of the thus-pressed carbon dioxide, so as to subject the solid carbon dioxide while being pressed through the passages due to the converging shape of the same to progressively increasing pressure sufficient to increase the density of the solid carbon dioxide and to form of the same a shaped carbon dioxide body substantially free of inner surface and having a density greater than the initial body of solid carbon dioxide.

According to a preferred embodiment of the present invention, the same contemplates a method of producing solid, high density carbon dioxide bodies of predetermined configuration, comprising the steps of placing a plate-shaped body of solid carbon dioxide having a density of about 1.5 on top of a mold consisting essentially of a plate formed with converging frusto-conical indentations corresponding to the desired predetermined configuration, subjecting the plate shaped solid carbon dioxide body on the mold to superatmospheric pressure sufficiently high to cause at least a portion of the carbon dioxide body to flow into the frusto-conical indentations substantially filling the same, thereby subjecting the solid carbon dioxide while flowing into the indentations, due to the converging frusto-conical shape of the same, to pressure sufficient to increase the density of the solid carbon dioxide, thus forming in each of the indentations, respectively, a shaped carbon dioxide body substantially free of inner surface and having a density greater than the density of the carbon dioxide plate, and removing the thus formed high density carbon dioxide bodies from the mold.

The present invention also includes a device for producing high density shaped solid carbon dioxide bodies of predetermined configuration, comprising, in combination, mold means having a receiving surface and formed with frusto-conical indentations converging inwardly from the receiving surface; receiving means for receiving a body of solid carbon dioxide and for holding the same in contact with the receiving surface; and means operatively connected with the mold means for pressing at least portions of the body of solid carbon dioxide into the converging indentations, so as to increase the density of the portions of solid carbon dioxide while the same are pressed into the converging indentations, and to form thereof shaped high density carbon dioxide bodies of predetermined configuration and substantially free of inner surface.

According to another embodiment, the present invention contemplates a device for producing high density shaped solid carbon dioxide bodies of predetermined configuration, comprising, in combination, a substantially plate shaped mold having a substantially plane receiving surface and a discharging surface arranged opposite each other, and comprising a plurality of wall portions integral with each other extending from the receiving to the discharging surface and defining a plurality of bores extending from the receiving surface to the discharging surface and converging in the direction towards the discharging surface, the wall portions having a continuous end face forming part of the receiving surface, the major portion of the plane of the receiving surface being formed by the plurality of bores, receiving means for receiving a body of solid carbon dioxide and for holding the same in contact with the receiving surface, and means operatively connected with the mold means for pressing at least portions of the body of solid carbon dioxide through the converging bores, so as to increase the density of the portions of solid carbon dioxide while the same are pressed through the converging bores, and to form thereof strands of high density solid carbon dioxide substantially free of inner surface.

Thus, according to the present invention, a carbon dioxide plate having a specific gravity in the neighborhood of about 1.5, is pressed with such force against a plate-shaped mold formed with a plurality of identically shaped indentations or bores the wall of which converges in the direction of pressure or of flow of the carbon dioxide, that the above mentioned carbon dioxide plate will be separated into a plurality of shaped bodies corresponding to the shape of the indentations in the plate mold, or into a plurality of strands if the plate is formed with bores extending throughout the same. In either case, due to the converging shape of the indentations or bores into which the carbon dioxide plate is pressed and the applied pressure, the density of the solid carbon dioxide will increase and thus will be higher than the density of the carbon dioxide plate which is subjected to such pressure. Thereby, the inner surface in the original carbon dioxide plate will be eliminated, and the strands of carbon dioxide emanating from the bores, or the carbon dioxide bodies formed in the indentations, will be of glass-like substantially clear appearance and will be substantially free of any inner surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view of the present device, partially in cross section; and FIG. 2 is an elevational view in cross section of another embodiment of the device according to the present invention.

Referring now to the drawing and particularly to FIG. 1, a steel plate 1 is shown in cross section, being formed with frusto-conical indentations extending downwardly from the upper surface of the steel plate. The individual frusto-conical indentations are arranged closely adjacent but spaced from each other so that the wall forming portions of the steel plate between adjacent indentations possess a minimum thickness of about 1 millimeter. A plate or disc of solid carbon dioxide, i.e., of Dry Ice having a density of about 1.5, is then placed on the receiving surface of the plate 1, i.e. on the surface formed with the above mentioned indentations 2. The thickness of the Dry Ice plate 4 is about 16 millimeters. A piston or ram 5 is then pressed against the carbon dioxide plate 4. Ram 5 for instance may be actuated by hydraulic means (not shown) and will exert a pressure of about 80 kilograms per square centimeter. By thus subjecting the carbon dioxide plate to the above described pressure and preferably by preventing lateral movement of the carbon dioxide plate, the same will be made to flow into indentations 2 of steel plate 1. After thus filling indentations 2 with solid carbon dioxide, ram 5 is raised, plate 1 is turned over and the shaped high density solid carbon dioxide bodies formed in the respective indentations 2 will fall out. It is essential according to the present invention that the indentations converge inwardly. In this manner, the formation of high density, substantially clear, glass-like carbon dioxide bodies, substantially free of inner surface is achieved. The thus formed individual high density solid carbon dioxide bodies will easily fall out of the plate when the same is turned over so that the open ends of the indentations face downwardly. This apparently is due to evaporation of a very thin outer layer of the shaped bodies in contact with plate 1.

In a more or less similar manner, as illustrated in FIG. 2, strands of high density carbon dioxide can be extruded.

The extrusion device shown in FIG. 2 comprises a cylinder 9 with an upper piston 15 and a lower piston 25 inserted in cylinder 9 and adapted for simultaneous or independent sliding movement therein. A perforated plate 6 formed with downwardly converging frusto-conical perforations 7 and including wall portions 8 extends in the center of cylinder 9 throughout the entire cross section of the same. Between plate 6 and lower piston 25, a spacing sleeve 11 is arranged, capable of withstanding high pressures which may be exerted by inward movement of piston 25.

Piston 15, for instance, may have a diameter of 180 mm., while the diameter of piston 25 which is spaced from perforated plate 6 by spacing sleeve 11 may be 150 mm. The two pistons, as well as perforated plate 6 and spacing sleeve 11 are made of high-grade stainless steel (V₂A-Steel). The outer diameter of spacing sleeve 11 will be 180 mm. corresponding to the diameter of piston 15 and to the inner diameter of cylinder 9. The inner diameter of spacing sleeve 11 is 160 mm. and its height 150 mm.

As illustrated, a body of Dry Ice 14 in the shape of a plate 120 mm. thickness and 180 mm. diameter, having a temperature of about −79.8° C. and a specific weight of 1.5 is inserted between upper piston 15 and perforated plate 6. The pistons are preferably hydraulically actuated and at an oil pressure of 80 kg./cm.², a pressure of about 20 tons will be exerted.

Thus, according to the present invention, the starting material for producing high density shaped carbon dioxide bodies, will be carbon dioxide ice of coarse crystalline structure and having a specific gravity or density of about 1.5. This material which is commercially available under the name carbon dioxide ice or Dry Ice, is further compressed according to the present invention so that for all practical purposes any inner surface at which evaporation could take place is eliminated. Compression of the Dry Ice by exerting pressure onto the Dry Ice plate and by causing it to flow through bores or into indentations of continuously decreasing cross section, will be carried out in such a manner that Dry Ice bodies are obtained which have a density of up to about 1.56.

Surprisingly, it has been found that this desirable result can be obtained in such economical and simple manner due to the fact that the walls of the indentations or bores converge in the direction of flow of the carbon dioxide. When a similar process was carried out in a similar device however with the essential change that the bores or indentations are of constant not converging cross section throughout, it was not possible to obtain the desired high degree of compression and of elimination of the inner surface of the solid carbon dioxide.

As stated further above, when operating with the device schematically illustrated in FIG. 1, the high density solid carbon dioxide will evaporate at the wall portions of the indentations which offer resistance to the flow of the carbon dioxide, so that shaped bodies having a configuration conforming to the shape of the indentation will be produced which can be individually moved by simple turning over of the mold plate, whereby the bodies will fall out of the plate by force of gravity. The indentations can be of any desired cross sectional configuration, provided that they have a converging shape of continuously decreasing cross section. The same holds true for the bores illustrated in FIG. 2. Generally, it has been found advantageous to produce in the discussed and illustrated manner shaped high density carbon dioxide bodies having an individual weight of about from 0.4 to 2 grams which bodies may be used for instance as propellants for conventional sizes of aerosol containers.

Due to the absence of inner surface and the high compression of the high density solid carbon dioxide bodies produced according to the present invention, the same will evaporate at a much slower rate as conventionally produced solid carbon dioxide tablets or bodies. Experimentally, it has been determined that the rate of evaporation of carbon dioxide bodies produced according to the present invention and according to the prior art will be about 33 to 18, in other words, that the rate of evaporation of the prior art carbon dioxide bodies is equal to 1.835 times the rate of evaporation of the carbon dioxide bodies produced according to the present invention. The density of the carbon dioxide bodies produced according to the present invention will be about 1.56 as against 1.32 of bodies of compressed carbon dioxide snow, so that the density of the carbon dioxide bodies according to the present invention will be equal to 1.182 times the density of the prior art bodies. Thus, it is apparent that the longer evaporation period of the lesser rate of evaporation of carbon dioxide bodies produced according to the present invention is not based on the greater mass of equally shaped bodies produced according to the present invention as compared with the mass of bodies produced according to the discussed prior art methods, but is primarily due to the reduction in surface area at which evaporation can take place.

Thus, carbon dioxide bodies produced according to the present invention are particularly advantageous as propellant in connection with aerosols, since carbon dioxide is not only an inert gas but additionally thereto according to the present invention the evaporation rate of the carbon dioxide body is reduced and can be controlled as desired.

As illustrated, the present method can also be carried out as an extrusion process, whereby the extruded high density solid carbon dioxide strands are preferably cut off in the immediate vicinity of the discharging (lower) surface of the extrusion mold or plate.

The plate shaped mold according to the present invention is formed with a plurality of evenly shaped indentations or bores which converge in the direction of the pressure and into which a carbon dioxide plate having a density in the vicinity of 1.5 is pressed, for instance by means of a ram exerting the force of about 80 kilograms per square centimeter. If the mold plate is closed at its lower face, individual shaped bodies are formed in the individual indentations, which bodies will fall out upon tilting over of the mold plate. At the receiving surface of the mold plate, the walls separating the individual indentations or bores from each other will form only a relatively small portion of the entire surface of the plate, the major portion of the surface being formed by the bores or indentations. By forming the plate with as many bores or indentations as possible and thus with only a relatively small solid surface portion, the energy required for compressing the carbon dioxide plate into the bores or indentations will be reduced and the loss of raw material, i.e., of carbon dioxide of about 1.5 density will also be reduced. According to a preferred embodiment, the mold plate is formed with indentations which are of substantially conical or somewhat frusto-conical shape, whereby the base of the cone in the plane of the receiving surface of the mold plate will be about 5 to 10 millimeters and the height to the tip of the cone or the upper plane of the frusto-conical configuration will be about 2 to 3 times the diameter in the plane of the receiving surface of the mold plate. The thickness of the wall portions separating the individual indentations or bores in the plane of the receiving surface of the mold will be about 1 millimeter. Of course, the thickness of the wall portions will increase in downward direction corresponding to the converging shape of the bores or indentations.

The following examples are given as illustrative of the process of said present invention without being intended to limit the invention to the specific data given therein.

*Example I*

Reference is made to FIG. 1 of the drawing.

A Dry Ice plate 4 having a diameter of 180 mm., a thickness of 20 mm., a specific weight of 1.5, and a temperature of $-79.8°$ C. is pressed against steel plate 1 by downward movement of ram or piston 5. Piston and plate are made of chromium-nickel steel (V2A-steel).

Prior to introduction of Dry Ice plate 4, the device is pre-cooled with Dry Ice to about $-60°$ C. Thereafter, Dry Ice plate 4 is introduced and a pressure of 80 kg./cm.$^2$ is exerted by piston 5 against the upper face of Dry Ice plate 4. Considering the diameter of 180 mm., the total pressure to which the Dry Ice plate is exposed is equal to about 20.4 tons. Thereby, Dry Ice is pressed into the frusto-conical indentations 2 of plate 1. The piston is then moved upwardly, plate 1 is removed from the cylinder and turned about so that the openings of indentations 2 will face downwardly. Thereby, the high density Dry Ice bodies will fall out of indentations 2 or can be removed easily from the same by slight tapping of the opposite face of plate 1 with a wooden mallet.

The thus formed bodies of Dry Ice are of glassy, transparent appearance and have a specific weight of about 1.56. Depending on the shape and size of the indentations in pate 1, high density Dry Ice bodies may be produced which, for instance, have the following dimensions: length 15 mm., maximum diameter 7.6 mm., minimum diameter 7.2 mm., specific weight 1.56, and individual weight 1 g.

In similar manner, with indentations of different configuration, Dry Ice bodies in the shape of truncated pyramids, having a height of 15 mm., an upper plane surface of 14.5 x 14.5 mm., a lower plane surface of 15 x 15 mm., a specific gravity of 1.56, and an individual weight of 5 g. can be produced from a plate of Dry Ice similar to plate 4 described above.

*Example II*

In the present example, reference is made to FIG. 2 of the drawing.

It is noted that the device illustrated in FIG. 2 may also be used for carrying out a process substantially similar to the process described in Example I, whereby removal of the indented plate in accordance with Example I will be accomplished by downward withdrawal of lower piston 25.

A Dry Ice plate having a diameter corresponding to the inner diameter of cylinder 9, i.e. a diameter of 180 mm., a height of 120 mm., specific weight of 1.5, and a temperature of $-79.8°$ C. is processed in the device illustrated in FIG. 2. Perforated plate 6 formed with downwardly converging bores 7 is supported by spacing sleeve 11 which in turn is supported by lower piston 25. Spacing sleeve 11 has a height of 150 mm., an outer diameter of 180 mm., an inner diameter of 160 mm. and a wall thickness of 10 mm. Again, a pressure of 20.4 tons equal to 80 kg./cm.$^2$ is exerted by the pistons.

The process comprises the following steps:

(1) Pre-cooling of the extrusion device (the essential parts of which are made of chromium-nickel steel) to about $-60°$ C.

(2) Placing pre-cooled spacing sleeve 11 onto lower piston 25.

(3) Placing pre-cooled perforated plate 6 onto spacing sleeve 11.

(4) Placing pre-cut Dry Ice plate 14 onto perforated plate.

(5) Exerting pressure of 20.4 tons onto upper and lower pistons 15 and 25 so that Dry Ice plate 14 is pressed against perforated plate 6.

Thereby, the Dry Ice plate will be extruded through perforations 7 into rods which will now be located in the area surrounded by spacing sleeve 11.

(6) Hydraulic pressure is then applied in such a manner that lower piston 25 moves upwardly and pushes perforated plate 6 and spacing sleeve 11 out of cylinder 9.

(7) A thin wire is now inserted between perforated plate 6 and spacing sleeve 11 and is moved quickly across the lower surface of perforated plate 6. Thereby, the extruded rods of high density Dry Ice are separated from perforated plate 6.

Preferably, a heated wire is utilized for this purpose and is moved in a plane perpendicular to the extruded rods, as, for instance, described in German Patent No. 839,805.

(8) After removal of perforated plate 6, the Dry Ice rods may be taken from the interior of spacing sleeve 11. Short Dry Ice bodies remaining in the perforations of plate 6 may be removed from the same in the manner described in Example I with respect to removal of Dry Ice bodies from plate 1.

The Dry Ice rods and bodies formed as described herein are of glassy, transparent appearance and have a specific weight of 1.56. As described above, for instance, Dry Ice rods having diameters of 7.2 mm., a length of 150 mm., a specific weight of 1.56, and an individual weight of 9.5 g. can be produced.

By changing the diameter of the rods, i.e. the smaller diameter of the perforations in plate 6, and the height of the spacing sleeve, as well as the thickness of the originally introduced Dry Ice plate, it is possible produce high density Dry Ice rods of any desired cross section and of very considerable length. These rods then may be cut, for instance, at equal intervals by means of a heated wire in order to produce in a semi-continuous manner a great number of individual high density Dry Ice bodies.

The Dry Ice temperature above referred to, i.e. $-79.8°$ C. is applicable to normal air pressure at sea level, i.e. a pressure of 760 mm. mercury. However, corresponding to variations in ambient pressure, the temperature may vary, and variations up to 3° C. have been found at different air pressures.

It will be understood that each of the elements described above, or two or more together, may also find a useful application in other types of devices for producing high density bodies of solid carbon dioxide differing from the types described above.

While the invention has been illustrated and described as embodied in a device for producing a plurality of equally shaped high density solid carbon dioxide bodies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing solid, high density carbon dioxide bodies of predetermined configuration, comprising the step of pressing an initial body of solid carbon dioxide having a density of about 1.5 into a mold having a converging shape of continuously decreasing cross-section in the direction of flow of the thus-pressed carbon dioxide, so as to subject the solid carbon dioxide while being pressed into said mold due to the converging shape of the same to progressively increasing pressure sufficient to increase the density of the solid carbon dioxide to about 1.56 and to form of the same a shaped carbon dioxide body which will evaporate at slow rate.

2. A method of producing solid, high density carbon dioxide bodies of predetermined configuration, comprising the step of pressing an initial body of solid carbon dioxide having a density of about 1.5 into a mold having a converging shape of continuously decreasing cross-section in the direction of flow of the thus-pressed carbon dioxide, so as to subject the solid carbon dioxide while being pressed into said mold due to the converging shape of the same to progressively increasing pressure sufficient to increase the density of the solid carbon dioxide to about 1.56 and to form of the same a shaped carbon dioxide body having a density of about 1.56; and removing the thus-formed high density carbon dioxide body from said mold.

3. A method of producing solid, high density carbon dioxide bodies of predetermined configuration, comprising the step of pressing an initial body of solid carbon dioxide having a density of about 1.5 through passages having a converging shape of continuously decreasing cross section in the direction of flow of the thus-pressed carbon dioxide in such a manner as to subject the solid carbon dioxide while being pressed through said passages due to the converging shape of the same to progressively increasing pressure sufficient to increase the density of the solid carbon dioxide to about 1.56 and to form of the same a shaped carbon dioxide body which will evaporate at a slow rate.

4. A method of producing solid, high density carbon dioxide bodies of predetermined configuration, comprising the step of pressing an initial body of solid carbon dioxide having a density of about 1.5 through passages having a converging shape of continuously decreasing cross-section in the direction of flow of the thus-pressed carbon dioxide, so as to subject the solid carbon dioxide while being pressed through said passages due to the converging shape of the same to progressively increasing pressure sufficient to increase the density of the solid carbon dioxide to about 1.56 and to form of the same an extruded strand of shaped carbon dioxide having a density of about 1.56.

5. A method of producing solid, high density carbon dioxide bodies of predetermined configuration, comprising the step of pressing an initial body of solid carbon dioxide having a density of about 1.5 through passages having a converging shape of continuously decreasing cross-section in the direction of flow of the thus-pressed carbon dioxide, so as to subject the solid carbon dioxide while being pressed through said passages due to the converging shape of the same to progressively increasing pressure sufficient to increase the density of the solid carbon dioxide to about 1.56 and to form of the same an extruded strand of shaped carbon dioxide having a density of about 1.56; and sub-dividing said extruded strand of high density carbon dioxide into a plurality of individual high density carbon dioxide bodies of predetermined length.

6. A method of producing solid, high density carbon dioxide bodies of predetermined configuration, comprising the steps of placing a plate-shaped body of solid carbon dioxide having a density of about 1.5 on top of a mold consisting essentially of a plate formed with converging frusto-conical indentations corresponding to said desired predetermined configuration; and subjecting said plate shaped solid carbon dioxide body on said mold to superatmospheric pressure sufficiently high to cause at least a portion of said solid carbon dioxide body to flow into said frusto-conical indentations substantially filling the same, thereby subjecting the solid carbon dioxide while flowing into said indentations, due to the converging frusto-conical shape of the same, to pressure sufficient to increase the density of said solid carbon dioxide to about 1.56, thus forming in each of said indentations, respectively, a shaped carbon dioxide body having a density of about 1.56.

7. A method of producing solid, high density carbon dioxide bodies of predetermined configuration, comprising the steps of placing a plate-shaped body of solid carbon dioxide having a density of about 1.5 on top of a mold consisting essentially of a plate formed with converging frusto-conical indentations corresponding to said desired predetermined configuration; subjecting said plate shaped solid carbon dioxide body on said mold to superatmospheric pressure sufficiently high to cause at least a portion of said carbon dioxide body to flow into said frusto-conical indentations substantially filling the same, thereby subjecting the solid carbon dioxide while flowing into said indentations, due to the converging frusto-conical shape of the same, to pressure sufficient to increase the density of said solid carbon dioxide to about 1.56, thus forming in each of said indentations, respectively, a shaped carbon dioxide body having a density greater than the density of about 1.56; and removing the thus formed high density carbon dioxide bodies from said mold.

8. A method of producing solid, high density carbon dioxide bodies of predetermined configuration, comprising the steps of placing a plate-shaped body of solid carbon dioxide having a density of about 1.5 on top of a mold consisting essentially of a plate formed with converging bores of frusto-conical configuration therethrough; and subjecting said plate shaped solid carbon dioxide body on said mold to superatmospheric pressure sufficiently high to cause at least a portion of said carbon dioxide body to flow through said frusto-conical bores, thereby subjecting the solid carbon dioxide while flowing through said bores, due to the converging frusto-conical shape of the same, to pressure sufficient to increase the density of said solid carbon dioxide to about 1.56, thus extruding through each of said bores a shaped strand of carbon dioxide having a density of about 1.56.

9. A method of producing solid, high density carbon dioxide bodies of predetermined configuration, comprising the step of pressing an initial body of solid carbon dioxide having a density of about 1.5 with a pressure of about 80 kg./cm.$^2$ into space having a converging shape of continuously decreasing cross-section in the direction of flow of the thus-pressed carbon dioxide, so as to subject the solid carbon dioxide while being pressed into said space due to the converging shape of the same to progressively increasing pressure sufficient to increase the density of the solid carbon dioxide to about 1.56 and to form the same a shaped carbon dioxide body which will evaporate at a slow rate.

References Cited in the file of this patent

FOREIGN PATENTS

| | | |
|---|---|---|
| 431,482 | Italy | Feb. 15, 1947 |
| 477,587 | Great Britain | Dec. 30, 1937 |
| 477,834 | Great Britain | Dec. 30, 1937 |
| 484,570 | Germany | Oct. 17, 1929 |
| 644,447 | France | Apr. 23, 1929 |
| 805,534 | France | Nov. 12, 1936 |